(12) United States Patent
Yom et al.

(10) Patent No.: US 11,489,186 B2
(45) Date of Patent: Nov. 1, 2022

(54) AIR-WATER CONCENTRATION CELL

(71) Applicants: Typher Yom, Manhasset, NY (US);
Jong Won Yom, Manhasset, NY (US);
Phillip Yom, Manhasset, NY (US)

(72) Inventors: Typher Yom, Manhasset, NY (US);
Jong Won Yom, Manhasset, NY (US);
Phillip Yom, Manhasset, NY (US)

(*) Notice: Subject to any disclaimer, the term of this patent is extended or adjusted under 35 U.S.C. 154(b) by 217 days.

(21) Appl. No.: 17/093,899

(22) Filed: Nov. 10, 2020

(65) Prior Publication Data
US 2021/0066739 A1    Mar. 4, 2021

Related U.S. Application Data

(63) Continuation-in-part of application No. 15/416,577, filed on Jan. 26, 2017, now Pat. No. 10,833,343.

(51) Int. Cl.
*H01M 8/1009* (2016.01)
*H01M 14/00* (2006.01)
*H01M 4/96* (2006.01)

(52) U.S. Cl.
CPC ........... *H01M 8/1009* (2013.01); *H01M 4/96* (2013.01); *H01M 14/00* (2013.01)

(58) Field of Classification Search
None
See application file for complete search history.

(56) References Cited

U.S. PATENT DOCUMENTS

| 7,790,125 B2 | 9/2010 | Kato |
| 9,337,494 B2 | 5/2016 | Zhang et al. |
| 2009/0081527 A1 | 3/2009 | He et al. |
| 2014/0072836 A1 | 3/2014 | Mills |
| 2015/0345034 A1 | 12/2015 | Sundara et al. |
| 2016/0104926 A1 | 4/2016 | Nitta |

FOREIGN PATENT DOCUMENTS

WO    2007/119130    10/2007

*Primary Examiner* — Tracy M Dove

(57) ABSTRACT

An air-water concentration cell is provided as follows. A cathode electrode is formed of a first material for catalyzing an oxygen reduction reaction (ORR). An anode electrode is formed of a second material for catalyzing an oxygen evolution reaction (OER). A proton conductive membrane is interposed between the cathode electrode and the anode electrode. A fuel reservoir is interposed between the proton conductive membrane and the anode electrode. The fuel reservoir contains water. The water of the fuel reservoir is in contact with the anode electrode and the proton conductive membrane.

10 Claims, 8 Drawing Sheets

AIR-WATER CONCENTRATION CELL

CROSS-REFERENCE TO RELATED APPLICATION

This application is a continuation-in-part of U.S. patent application Ser. No. 15/416,577, filed on Jan. 26, 2017, issued as U.S. Pat. No. 10,833,343 on Nov. 10, 2020, the disclosure of which is incorporated by reference herein in its entirety.

TECHNICAL FIELD

The present inventive concept relates to an air-water concentration cell.

DISCUSSION OF RELATED ART

Concentration cells are formed of galvanic cells having two equivalent half-cells. The same reaction occurs in the half-cells but in opposite directions, producing a potential difference.

SUMMARY

According to an exemplary embodiment of the present inventive concept, an air-water concentration cell is provided as follows. A cathode electrode is formed of a first material for catalyzing an oxygen reduction reaction (ORR). An anode electrode is formed of a second material for catalyzing an oxygen evolution reaction (OER). A proton conductive membrane is interposed between the cathode electrode and the anode electrode. A fuel reservoir is interposed between the proton conductive membrane and the anode electrode. The fuel reservoir contains water. The water of the fuel reservoir is in contact with the anode electrode and the proton conductive membrane.

According to an exemplary embodiment of the present inventive concept, an air-water concentration cell is provided as follows. A fuel reservoir contains water. A cathode electrode is disposed on a first region of the fuel reservoir. The cathode electrode is formed of a first material for catalyzing an oxygen reduction reaction (ORR). An anode electrode is disposed on a second region of the fuel reservoir. The anode electrode is formed of a second material for catalyzing an oxygen evolution reaction (OER). The first region of the fuel reservoir and the second region of the fuel reservoir are on a same side of the fuel reservoir. A proton conductive membrane is interposed between the cathode electrode and the first region of the fuel reservoir. The water of the fuel reservoir is in contact with the anode electrode and the proton conductive membrane.

BRIEF DESCRIPTION OF DRAWINGS

These and other features of the present inventive concept will become more apparent by describing in detail exemplary embodiments thereof with reference to the accompanying drawings of which.

DETAILED DESCRIPTION OF EXEMPLARY EMBODIMENTS

Exemplary embodiments of the present inventive concept will be described below in detail with reference to the accompanying drawings. However, the inventive concept may be embodied in different forms and should not be construed as limited to the embodiments set forth herein. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present.

Figure 1:
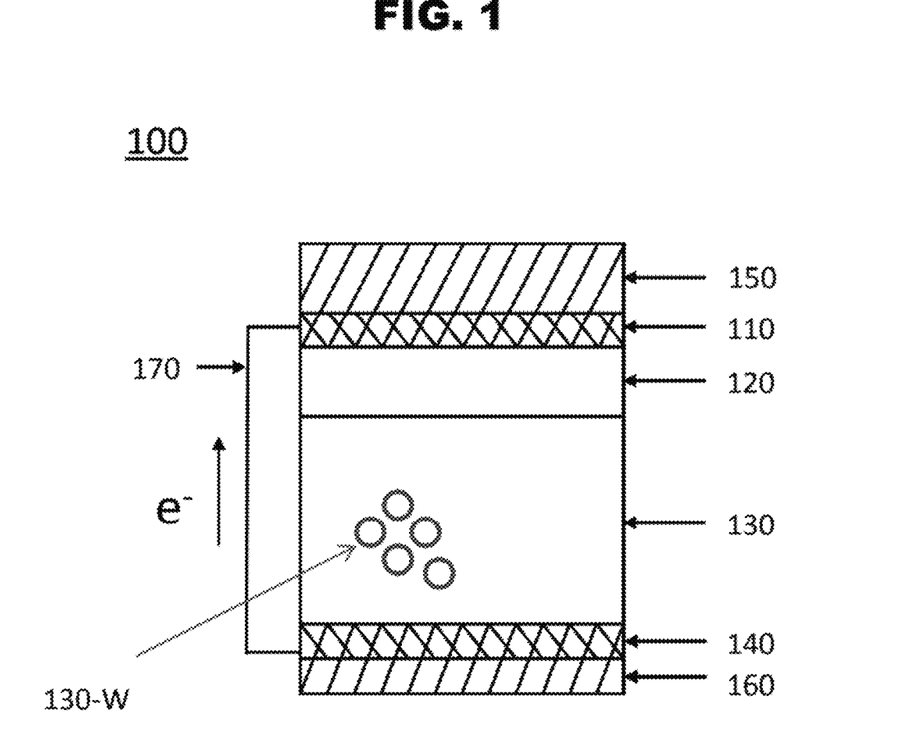
FIG. 1 is a cross-sectional view showing an air-water concentration cell according to an exemplary embodiment of the present inventive concept.

FIG. 1 is a cross-sectional view showing an air-water concentration cell 100 according to an exemplary embodiment of the present inventive concept.

The air-water concentration cell 100 includes a cathode electrode 110, a proton conductive membrane 120, a fuel reservoir 130 and an anode electrode 140.

The fuel reservoir 130 contains water 130-W. The fuel reservoir 130 may have an inlet (not shown here) through which the water 130-W is supplied. The fuel reservoir 130 may be formed of a material that contains the water 130-W, such as a container, cloth, or paper towel. In an exemplary embodiment, the fuel reservoir 130 may support structurally the constituent elements of the air-water concentration cell 100 such as the cathode electrode 110, the proton conductive membrane 120 and the anode electrode 140.

The water 130-W of the fuel reservoir 130 is in contact with the proton conductive membrane 120 and the anode electrode 140. The cathode electrode 110 is separated from the water 130-W of the fuel reservoir 130 by the proton conductive membrane 120. For example, the fuel reservoir is positioned at a first side of the proton conductive membrane 120 and the cathode electrode 110 is positioned at a second side of the proton conductive membrane 120. In an exemplary embodiment, the first side is the opposite to the second side. In this case, the water 130-W contained in the fuel reservoir 130 is in contact with the proton conductive membrane 120 and the anode electrode 140.

The proton conductive membrane 120 serves to selectively transport protons (H+). In an exemplary embodiment, the proton conductive membrane 120 may be formed of a proton exchange membrane (Nafion). However, the present inventive concept is not limited thereto. The proton conductive membrane 120 may include a material that allows for the transport of only protons (H+). For example, the proton conductive membrane 120 may be formed of proton-conductive ceramics, alkaline-earth cerates, or zirconate-based perovskites.

The proton conductive membrane 120 may also serve to prevent the water 130-W of the fuel reservoir 130 from reaching the cathode electrode 110.

The anode electrode 140 may be formed of graphene, for example. In an exemplary embodiment, the anode electrode 140 may be coated on a porous substrate so that the anode electrode 140 is coated on the inside surface of the porous substrate. In this case, the anode electrode 140 has an increased surface area compared to when the anode electrode 140 is coated on a flat surface. In this case, the anode electrode 140 may provide an increased reaction surface for an oxygen evolution reaction (OER) described below.

The porous substrate of the anode electrode 140 may be formed of silicon carbide (SiC). The formation of the graphene on the porous substrate is described in U.S. application Ser. No. 14/978,740 (hereinafter, the '740 application) filed on Dec. 22, 2015, the disclosure of which is incorporated by reference herein in its entirety. In particular, FIGS. 1B and 1C of the '740 application show an n-doped graphene layer 26 coated in a plurality of internal pores interconnected to each other without filling completely the plurality of internal pores. The graphene of the anode electrode 140 in FIG. 1 may be formed as the n-doped graphene layer 26 of FIGS. 1B and 1C in the '740 application.

The present inventive concept, however, is not limited thereto. For example, the porous substrate may be formed of porous aluminum oxide or porous ceramics.

The cathode electrode 110 may be formed of nitrogen-doped graphene, for example. In an exemplary embodiment, the cathode electrode 110 may be coated on a porous substrate to have an increased surface area. In this case, the cathode electrode 110 may provide an increased reaction surface for an oxygen reduction reaction (ORR) described below.

The porous substrate of the cathode electrode 110 may be formed of silicon carbide (SiC). The formation of the nitrogen-doped graphene on the porous substrate is described in the '740 application.

The cathode electrode 110 is in direct contact with the proton conductive membrane 120 so that the protons (H+) arrive at the cathode electrode 110 through the proton conductive membrane 120. The cathode electrode 110 receives oxygen gases from the air surrounding the air-water concentration cell 100. The proton conductive membrane 120 serves to separate the water 130-W of the fuel reservoir 130 from the cathode electrode 110.

The present inventive concept, however, is not limited thereto. For example, the porous substrate may be formed of porous aluminum oxide or porous ceramics.

The air-water concentration cell 100 further includes a current path 170 such as an electrical wire. The current path connects the anode electrode 140 to the cathode electrode 110 so that electrons generated from the anode electrode 140 travels to the cathode electrode 110. For the convenience of description, the cathode electrode 110 and the anode electrode 140 are short-circuited using the current path 170. If a load is connected between the cathode electrode 110 and the anode electrode 140, a voltage difference generated by the air-water concentration cell 100 is applied to the load.

The air-water concentration cell 100 further includes a first substrate 150 and a second substrate 160.

The first substrate 150 is in contact with the cathode electrode 110. In an exemplary embodiment, the first substrate 150 may be porous to the extent that the inflow of the oxygen gases into the cathode electrode 110 is not rate-limiting reactant to the oxygen reduction reaction (ORR) described below. The first substrate 150 may be formed of silicon carbide (SiC). The present inventive concept, however, is not limited thereto. For example, the first substrate 150 may be formed of porous aluminum oxide or porous ceramics. In an exemplary embodiment, the first substrate 150 may be substantially the same with the substrate of the cathode electrode 110. In this case, the n-doped graphene of the cathode electrode 110 may be formed in part of the first substrate 150.

The second substrate 160 is in contact with the anode electrode 140. In an exemplary embodiment, the second substrate 160 may be porous to the extent that oxygen ($O_2$) gases generated from the oxygen evolution reaction (OER) described below are removed into the air. The porosity of the second substrate 160 may be controlled to the extent that the OER does not reach the equilibrium state by releasing the oxygen ($O_2$) gas into the air. The second substrate 160 may be formed of silicon carbide (SiC). The present inventive concept, however, is not limited thereto. For example, the second substrate 160 may be formed of porous aluminum oxide or porous ceramics. In an exemplary embodiment, the second substrate 160 may be substantially the same with the substrate of the anode electrode 140. In this case, the graphene of the anode electrode 140 may be formed in part of the second substrate 160.

Hereinafter, it will be described that the air-water concentration cell 100 produces electricity using water and air with reference to FIG. 1. The description will be applicable to air-water concentration cells 200 to 500 of FIGS. 5 to 8.

At the anode electrode 140, an oxygen evolution reaction (OER) may occur as follows:

$$2H_2O \rightarrow 4H^+ + 4e^- + O_2.$$

The anode electrode 140 may be formed of graphene, catalyzing the OER. In this case, the anode electrode 140 is in direct contact with the water 130-W contained by the fuel reservoir 130. The water 130-W is consumed at the anode electrode 140. In an exemplary embodiment, water may be constantly supplied to the fuel reservoir 130 so that the water of the fuel reservoir 130 is in contact with the anode electrode 140.

The anode electrode 140 is formed of an OER-catalyzing material, such as graphene, for the OER described above. In an exemplary embodiment, the graphene of the anode electrode 140 may be provided as in a power mixture of graphene and graphite. The present inventive concept, however, is not limited thereto. For example, any material that catalyzes the OER may be used. For example, nitrogen-doped graphene or nickel-iron oxide nano-crystals may be used to form the anode electrode 140.

Electrons (e−) generated from the OER may flow to the cathode electrode 110 through the current path 170 connecting electrically the cathode electrode 110 and the anode electrode 140.

The protons (H+) generated from the OER may permeate the proton conductive membrane 120 so that the protons (H+) arrive at the cathode electrode 110.

Oxygen gas (O$_2$) generated from the OER is released to the air surrounding the air-water concentration cell 100.

At the cathode electrode 110, an oxygen reduction reaction (ORR) may occur as follows:

$$4H^+ + 4e^- + O_2 \rightarrow 2H_2O.$$

The protons (H+) and electrons (e−) are supplied from the anode electrode 140 through the proton conductive membrane 120 and the current path 170, respectively.

The cathode electrode 110 may be formed of nitrogen-doped graphene, catalyzing the ORR. In this case, the cathode electrode 110 is separated from the water 130-W contained in the fuel reservoir 130. For example, the proton conductive membrane 120 is interposed between the fuel reservoir 130 and the cathode electrode 110. The nitrogen-doped graphene of the cathode electrode 110 serves as an ORR-catalyzing material in the ORR described above. The present inventive concept, however, is not limited thereto. For example, any material that catalyzes the ORR may be used. For example, platinum or heteroatom doped carbon may be used to form the cathode electrode 110.

If the water 130-W is supplied to the cathode electrode 110, the concentration difference between the anode electrode 140 and the cathode electrode 110 disappears, and therefore the voltage difference between the cathode electrode 110 and the anode electrode 140 is not created.

In an exemplary embodiment, the anode electrode 140 may have various contact areas with the water 130-W of the fuel reservoir 130 to control the voltage difference between the anode electrode 140 and the cathode electrode 110.

Figure 2:
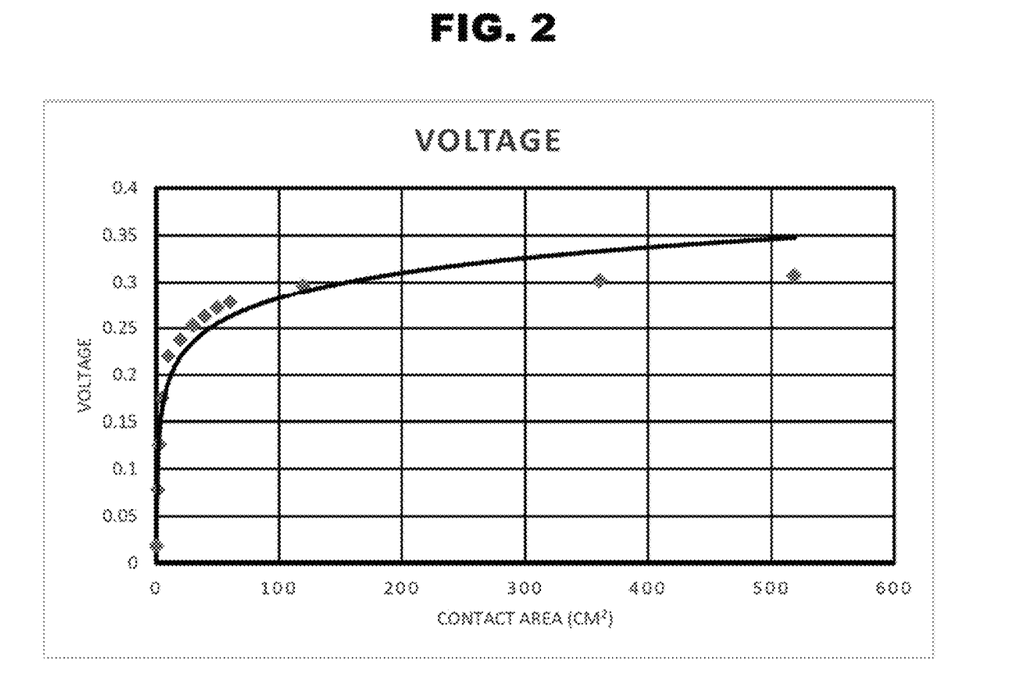
FIG. 2 shows a relationship between an anode electrode contact area to water and the resulting voltage according to an exemplary embodiment of the present inventive concept.
Figure 3:
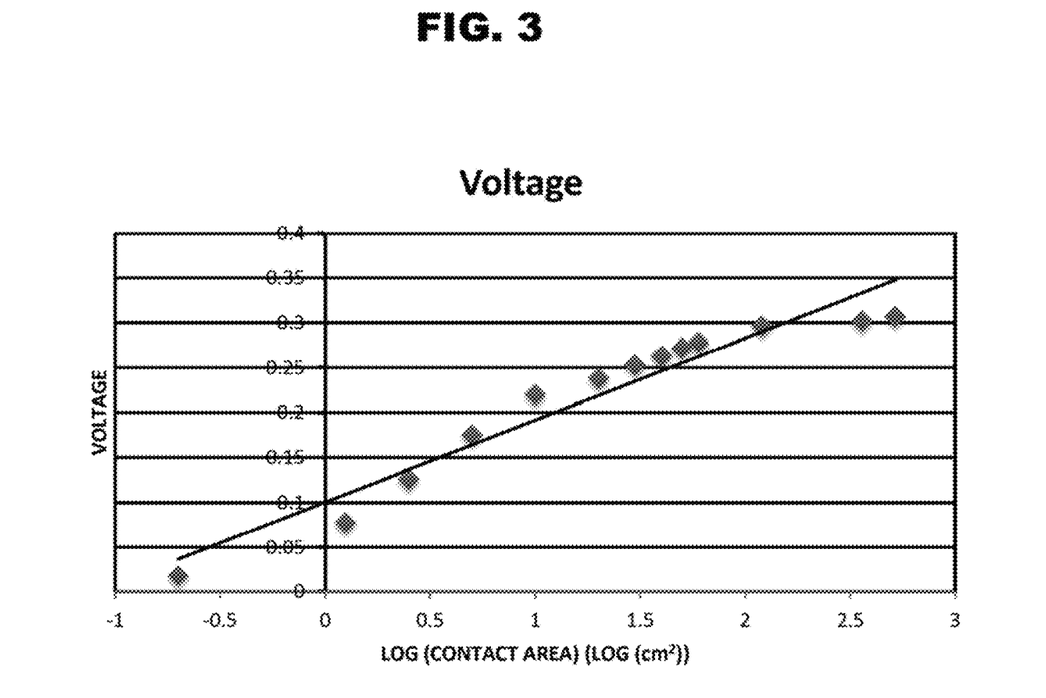
FIG. 3 shows a relationship between the log of an anode electrode contact area to water and the resulting voltage according to an exemplary embodiment of the present inventive concept.

FIG. 2 shows a relationship between the contact area of the anode electrode 140 with the water 130-W of the fuel reservoir 130 and the voltage difference between the anode electrode 140 and the cathode electrode 110 according to an exemplary embodiment of the present inventive concept. FIG. 3 shows the relationship of FIG. 2 in log scale. As shown in FIGS. 2 and 3, the voltage difference increases logarithmically as the contact area of the anode electrode 140 to the water 130-W increases.

Figure 4:
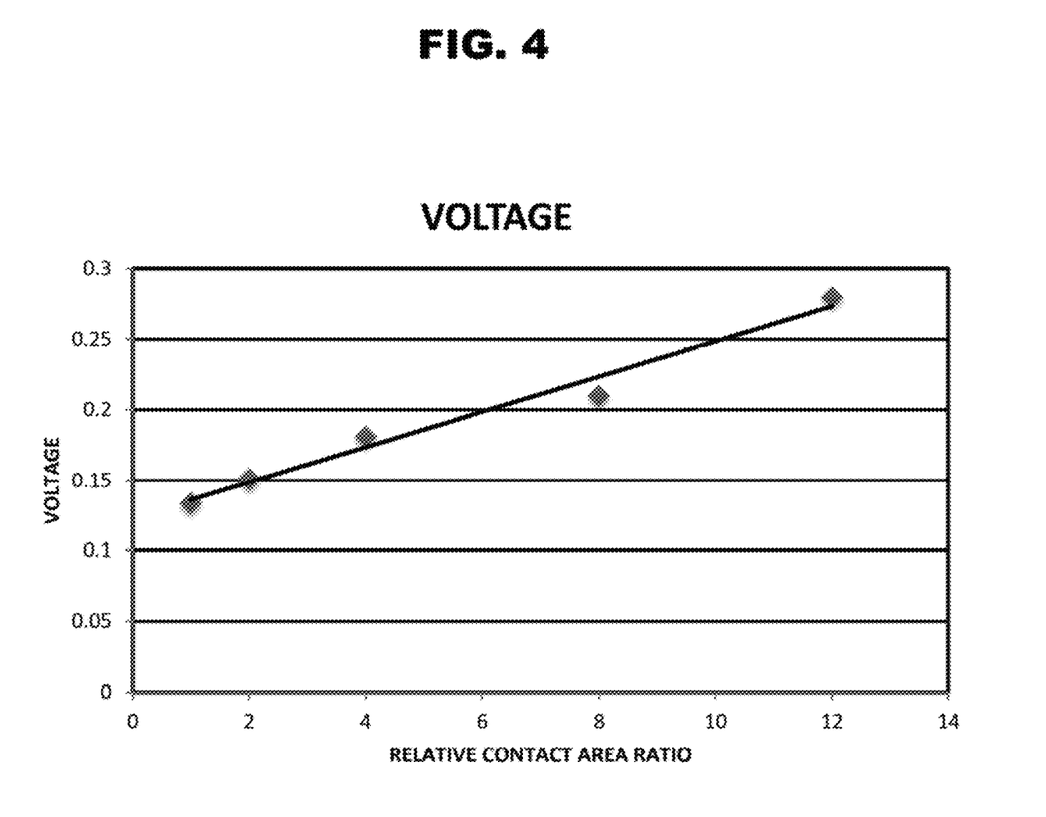
FIG. 4 shows a relationship between the area ratio of the contact area of the cathode electrode to the proton conductive layer and the resulting voltage.

In an exemplary embodiment, the cathode electrode 110 may have various contact areas with respect to the proton conductive membrane 120. FIG. 4 shows a voltage difference between the anode electrode 140 and the cathode electrode 110 with respect to a relative contact area of the cathode electrode 110 with respect to the proton conductive membrane 120. As shown in FIG. 4, the voltage difference increases as the relative contact area of the cathode electrode 110 with respect to the proton conductive membrane 120 increases.

In an exemplary embodiment, hydroxide ions (OH$^-$) may be added to the fuel reservoir to increase the voltage difference.

According to an exemplary embodiment, the anode electrode 140 formed of graphene is placed to be in contact with the water 130-W, while the cathode electrode 110 formed of nitrogen-doped graphene is placed to be in contact with the proton conductive membrane 120, as well as oxygen gases of the air. In this case, the OER attempts to reach equilibrium by reducing the amount of water and increasing the amount of oxygen while the ORR attempts to reach equilibrium by reducing the amount of oxygen and increasing the amount of water.

Figure 5:
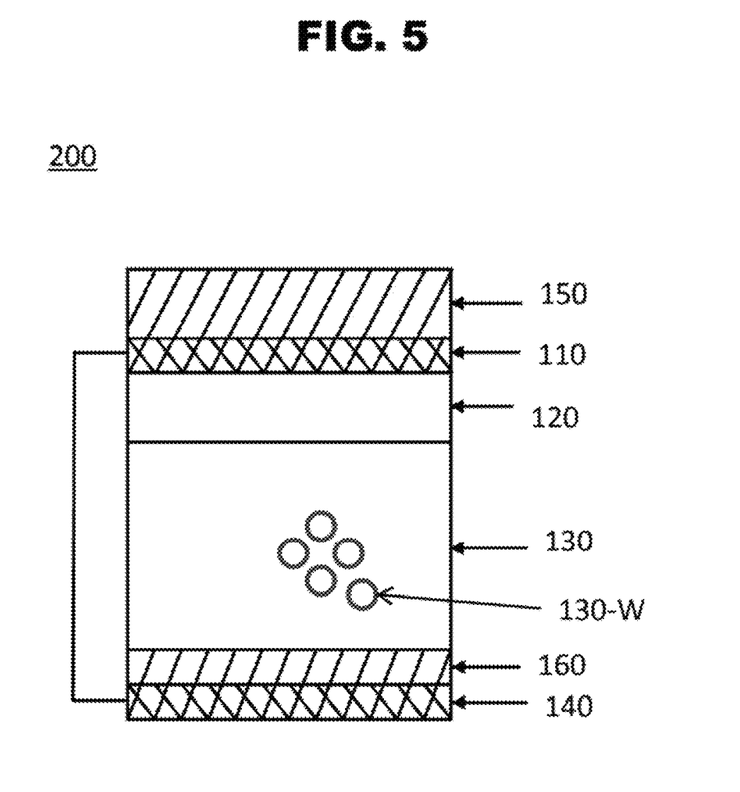
FIG. 5 is a cross-sectional view showing an air-water cell according to an exemplary embodiment of the present inventive concept.

FIG. 5 is a cross-sectional view showing an air-water concentration cell according to an exemplary embodiment of the present inventive concept.

The air-water concentration cell 200 may have the substantially the same structure as the air-water concentration cell 100 of FIG. 1, except that the second substrate 160 and the anode electrode 140 of FIG. 2 are placed different from those of FIG. 1. The description of the same elements having the same configuration will be omitted herein. The descriptions of the air-water concentration cell 200 will be focused on the difference.

In FIG. 5, the second substrate 160 is interposed between the fuel reservoir 130 and the anode electrode 140 so that the second substrate 160 is in contact with the water 130-W of the fuel reservoir 130. The water 130-W may pass through the second substrate 160, arriving at the anode electrode 140. The OER described above is catalyzed by the graphene of the anode electrode 140, for example.

Figure 6:
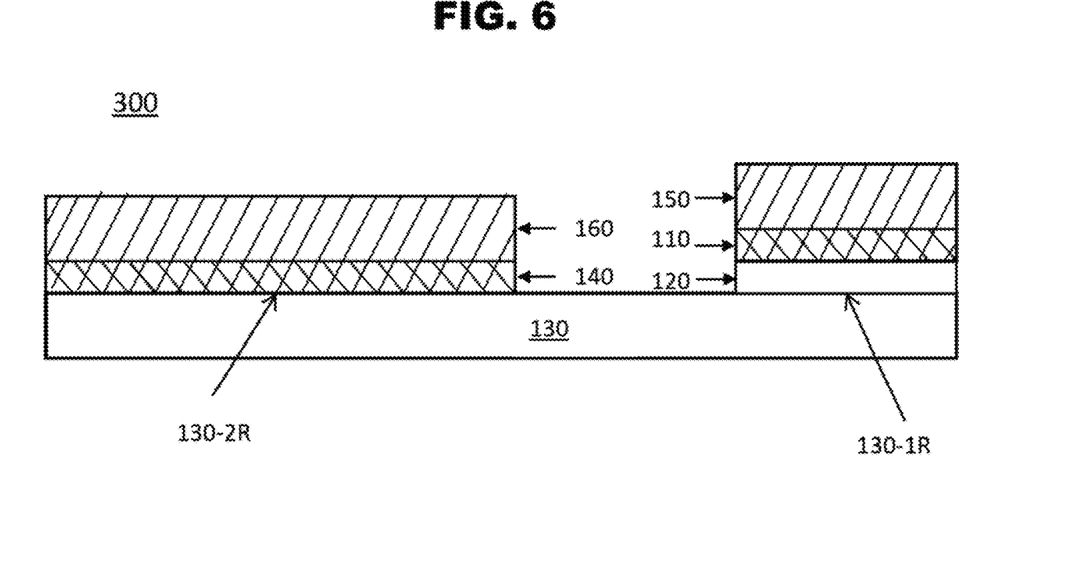
FIG. 6 is a cross-sectional view showing an air-water cell according to an exemplary embodiment of the present inventive concept.

FIG. 6 is a cross-sectional view showing an air-water concentration cell 300 according to an exemplary embodiment of the present inventive concept.

The air-water concentration cell 300 may have the substantially the same structure as the air-water concentration cell 100 of FIG. 1, except that the first substrate 150, the cathode electrode 110 and the proton conductive membrane 120 of FIG. 6 are positioned on the same side of the fuel reservoir 130 with the anode electrode 140. In FIG. 1, the cathode electrode 110 and the anode electrode 140 are positioned at the opposite sides of the fuel reservoir 130. In FIG. 6, the cathode electrode 110 and the anode electrode 140 are positioned on the same side of the fuel reservoir 130. For example, the cathode electrode 110 is positioned on a first region 130-1R of the fuel reservoir 130; the anode electrode 140 is positioned on a second region 130-2R of the fuel reservoir 130. The first region 130-1R of the fuel reservoir 130 and the second region 130-2R of the fuel reservoir 130 are on the same side of the fuel reservoir 130.

Figure 7:
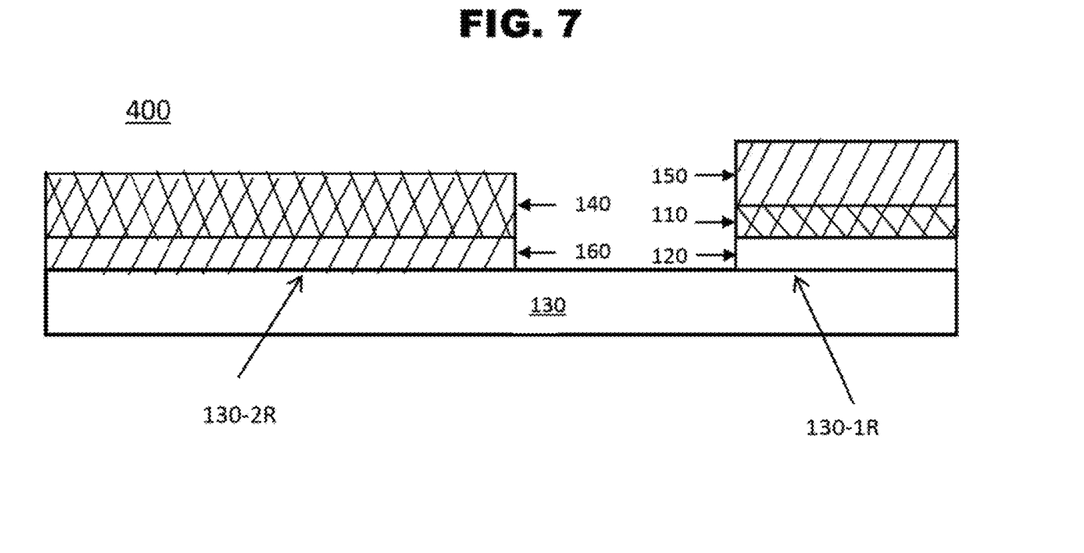
FIG. 7 is a cross-sectional view showing an air-water cell according to an exemplary embodiment of the present inventive concept.

FIG. 7 is a cross-sectional view showing an air-water concentration cell 400 according to an exemplary embodiment of the present inventive concept.

The air-water concentration cell 400 may have the substantially the same structure as the air-water concentration cell 200 of FIG. 5, except that the first substrate 150, the cathode electrode 110 and the proton conductive membrane 120 of FIG. 7 are positioned on the same side of the fuel reservoir 130 with the anode electrode 140. In FIG. 5, the cathode electrode 110 and the anode electrode 140 are positioned at the opposite sides of the fuel reservoir 130. In FIG. 7, the cathode electrode 110 and the anode electrode 140 are positioned on the same side of the fuel reservoir 130. For example, the cathode electrode 110 is positioned on a first region 130-1R of the fuel reservoir 130; the anode electrode 140 is positioned on a second region 130-2R of the fuel reservoir 130. The first region 130-1R of the fuel reservoir 130 and the second region 130-2R of the fuel reservoir 130 are on the same side of the fuel reservoir 130.

Figure 8:
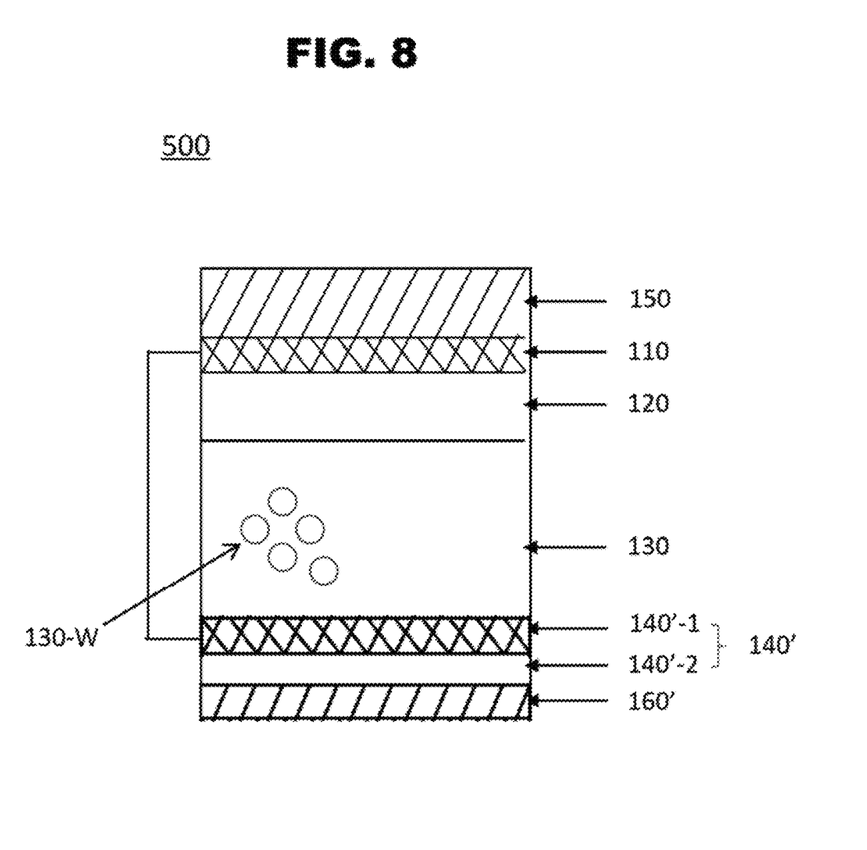
FIG. 8 shows a solar cell according to an exemplary embodiment of the present inventive concept.

FIG. 8 is a cross-sectional view showing an air-water concentration cell 500 according to an exemplary embodiment of the present inventive concept.

The air-water concentration cell 500 may have the substantially the same structure as the air-water concentration cell 100 of FIG. 1, except that the anode electrode 140' is formed of a dual layer having a graphene electrode 140'-1 and a photosensitive dye layer 140'-2.

The graphene electrode 140'-1 may be substantially the same as the anode electrode 140 of FIG. 1, catalyzing the OER.

The photosensitive dye layer 140'-2 may include chlorophyll which serves to split, with the aid of light, the water 130-W into the protons (H+) and electrons (e−), emitting the oxygen (O2). In this case, the photosensitive dye layer 140'-2 may increase the supply of the protons (H+) to the cathode electrode 110.

In an exemplary embodiment, a second substrate 160' may be formed of a transparent material for light to pass through. For example, the second substrate 160' may be formed of polyester film, cellulose acetate, or Polyethylene terephthalate (PET), for example.

The air-water concentration cell 500 may be applicable as a solar cell working in a rainy day or at night, for example. In a day time with sun light, the graphene electrode 140'-1 and the photosensitive dye layer 140'2 work together to generate protons (H+) and electrons (e−), emitting oxygen (O2). At night or in a rainy day, the graphene electrode 140'-1 may operate as the anode electrode 140 of FIG. 1.

Figure 9:
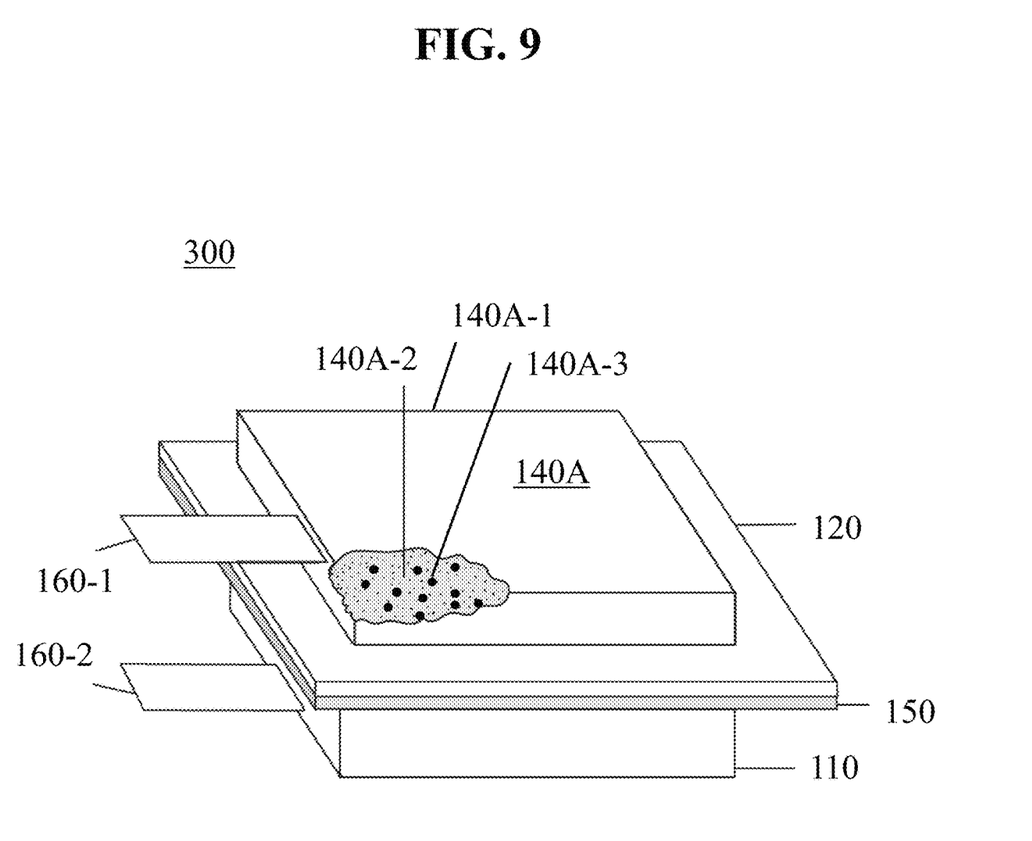
FIG. 9 shows a perspective view showing an air-water cell according to an exemplary embodiment of the present inventive concept.

FIG. 9 shows a perspective view showing an air-water concentration cell 300 according to an exemplary embodiment of the present inventive concept.

The air-water concentration cell 300 includes a cathode electrode 110, a proton conductive membrane 120, an anode electrode 140A, and an acidic layer 150. The air-water concentration cell 300 may have substantially the same constituent elements except for the anode electrode 140A and the acidic layer 150. For the simplicity of description, the descriptions of the same elements will be omitted.

The anode electrode 140A includes a pouch 140A-1, liquid water 140A-2 and catalyst particles 140A-3. The pouch 140A-1 may be formed of a material containing the liquid water 140A-2 such as a cloth and polypropylene. In an example embodiment, the pouch 140A-1 may hold the liquid water 140A-2 and the catalyst particles 140A-3 mixed with the liquid water 140A-2. In an exemplary embodiment, the catalyst particles 140A-3 may include graphite or nitrogen-doped graphene in powder form, and the catalyst particles 140A-3 in powder form may be mixed with the liquid water 140A-2 in the pouch 140A-1. The addition of the catalyst particles 140A-3 in powder form may increase voltage difference between the anode electrode 140A and the cathode electrode 110 as well as increase of current generated from the air-water concentration cell 300. For the clarity of drawings, some of the catalyst particles 140A-3 may be exaggerated in size.

At the anode electrode 140A, the oxygen evolution reaction may occur. The oxygen evolution reaction may be catalyzed by the catalyst particles 140A-3, and may generate protons from the liquid water 140A-2. The protons may be delivered to the cathode electrode 110 via the proton conductive membrane 120.

The catalyst particles 140A-3 may be provided in powder form with the anode electrode 140A to increase the surface area of the catalyst in the oxygen evolution reaction.

In an exemplary embodiment, a base such as KOH may be added to the anode electrode 140A to increase the amount of the protons generated from the liquid water 140A-2. For example, the base may be added to the liquid water 140A-2.

The cathode electrode 110 may be formed of nitrogen-doped graphene, for example. In an exemplary embodiment, the cathode electrode 110 may be coated on a porous substrate such silicon carbide to have an increased surface area. In this case, the cathode electrode 110 may provide an increased reaction surface for the oxygen reduction reaction (ORR).

The acidic layer 150 is disposed between the proton conductive membrane 120 and the cathode electrode 110. In an exemplary embodiment, the acidic layer 150 may include a water-absorbing-material layer such as a paper towel and a cloth containing an acidic solution such as $H_2SO_4$. The acidic solution may increase a forward reaction of the oxygen reduction reaction, thereby increasing current generated from the air-water concentration cell 300. The presence of the acidic layer 150 may also increase the voltage difference between the anode electrode 140A and the cathode electrode 110. In an exemplary embodiment, the acidic layer 150 may be omitted.

The air-water concentration cell 300 may further include a first connector 160-1 connected to the anode electrode 140A, and a second connector 160-2 connected to the cathode electrode 110.

Figure 10:
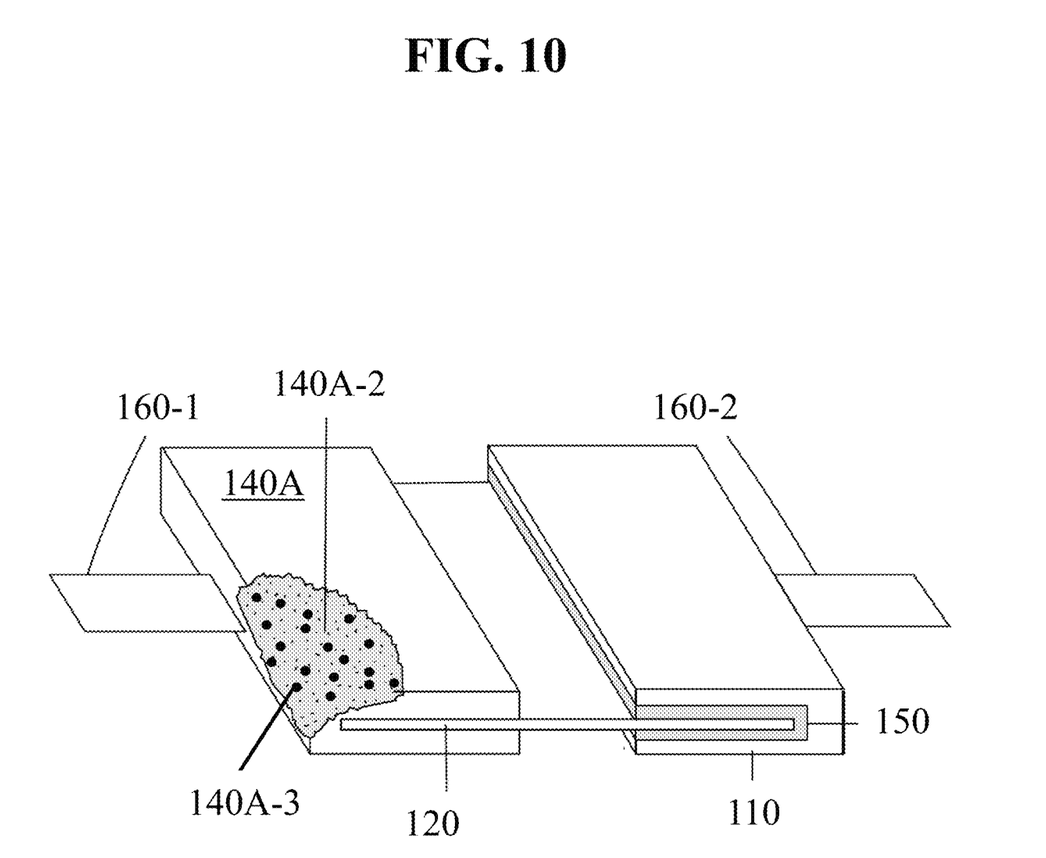
FIG. 10 shows a perspective view showing an air-water cell according to an exemplary embodiment of the present inventive concept.

FIG. 10 shows a perspective view showing an air-water concentration cell 400 according to an exemplary embodiment of the present inventive concept.

The air-water concentration cell 400 may have the substantially the same structure as the air-water concentration cell 300 of FIG. 9, except that the proton conductive membrane 120 has a first end enclosed by the anode electrode 140A and a second end enclosed by the acidic layer 150 and the cathode electrode 110. In an exemplary embodiment, the acidic layer 150 may be interposed between the cathode electrode 110 and the second end of the proton conductive membrane 120. In a case where the acidic layer 150 is omitted, the second end of the proton conductive membrane 120 may be enclosed by the cathode electrode 110.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. An air-water concentration cell, comprising:
   a cathode electrode formed of a first material for catalyzing an oxygen reduction reaction (ORR);
   an anode electrode including a pouch, a second material for catalyzing an oxygen evolution reaction (OER) and liquid water, wherein the pouch is configured to contain the second material and the liquid water and the second material is mixed with the liquid water; and
   a proton conductive membrane interposed between the cathode electrode and the anode electrode.

2. The air-water concentration cell of claim 1,
   wherein the pouch is formed of polypropylene.

3. The air-water concentration cell of claim 1,
   wherein the ORR is formed of $4H^+ + 4e^- + O_2 \rightarrow 2H_2O$, and
   wherein the first material of the cathode electrode includes n-doped graphene, platinum or heteroatom doped carbon.

4. The air-water concentration cell of claim 1,
   wherein the OER is formed of $2H_2O \rightarrow 4H^+ + 4e^- + O_2$, and
   wherein the second material of the anode electrode includes graphite, graphene, nitrogen-doped graphene or nickel-iron oxide nano-crystals.

5. The air-water concentration cell of claim 1,
   wherein the ORR is formed of $4H^+ + 4e^- + O_2 \rightarrow 2H_2O$,
   wherein the OER is formed of $2H_2O \rightarrow 4H^+ + 4e^- + O_2$,
   wherein the first material of the cathode electrode is formed of n-doped graphene, and
   wherein the second material of the anode electrode is formed of graphite or graphene.

6. The air-water concentration cell of claim 1,
wherein the second material of the anode electrode is in powder form, and
wherein the second material in the powder form is mixed with the liquid water.

7. The air-water concentration cell of claim 1,
wherein the proton conductive membrane includes a first end enclosed by the pouch of the anode electrode and a second end enclosed by the cathode electrode.

8. The air-water concentration cell of claim 1,
wherein the anode electrode further include a base in the liquid water contained by the pouch.

9. The air-water concentration cell of claim 1, further comprises:
an acidic layer between the cathode electrode and the proton conductive membrane, wherein the acidic layer contains an acid.

10. The air-water concentration cell of claim 9,
wherein the proton conductive membrane includes a first end enclosed by the pouch of the anode electrode and a second end enclosed by the acidic layer, and
wherein the acidic layer is interposed between the cathode electrode and the second end of the proton conductive membrane.

* * * * *